(12) United States Patent
Donahue et al.

(10) Patent No.: US 10,050,832 B2
(45) Date of Patent: Aug. 14, 2018

(54) SERVER CLUSTERING IN MOBILE COMPUTING ENVIRONMENT

(71) Applicant: Sybase 365, Inc., Dublin, CA (US)

(72) Inventors: Brett Donahue, Eagle, ID (US); Scott Strobel, Loveland, CO (US); Carl Schneidinger, Oakland, CA (US); William Flood, San Ramon, CA (US)

(73) Assignee: Sybase 365, Inc., Dublin, CA (US)

(*) Notice: Subject to any disclaimer, the term of this patent is extended or adjusted under 35 U.S.C. 154(b) by 92 days.

(21) Appl. No.: 14/491,603

(22) Filed: Sep. 19, 2014

(65) Prior Publication Data
US 2016/0087833 A1    Mar. 24, 2016

(51) Int. Cl.
G06F 15/177    (2006.01)
H04L 12/24    (2006.01)
G06F 17/30    (2006.01)

(52) U.S. Cl.
CPC ...... H04L 41/082 (2013.01); G06F 17/30584 (2013.01); H04L 41/084 (2013.01); H04L 41/0859 (2013.01)

(58) Field of Classification Search
CPC . H04L 41/0803; H04L 47/70; H04L 67/1002; H04L 67/2842; H04L 41/0886; H04L 41/12; H04L 41/0806; H04L 41/0813; H04L 41/0823; H04L 41/0869; H04L 29/12301; H04L 41/082; H04L 41/084; H04L 41/0859; H04L 67/1036; G06F 17/30575; G06F 11/2094; G06F 17/30584; G06F 17/30902; G06F 2212/283; G06F 3/065

USPC ....... 709/202, 203, 219–221, 228, 229, 239, 709/242; 707/609, 610, 705, 781
See application file for complete search history.

(56) References Cited

U.S. PATENT DOCUMENTS

| | | | | |
|---|---|---|---|---|
| 6,014,669 | A * | 1/2000 | Slaughter | G06F 17/30581 707/610 |
| 6,078,960 | A * | 6/2000 | Ballard | H04L 67/1008 709/203 |
| 6,240,414 | B1 * | 5/2001 | Beizer | G06F 17/30176 |
| 2003/0046286 | A1 * | 3/2003 | Jacobs | G06F 17/30902 |
| 2005/0055386 | A1 * | 3/2005 | Tosey | G06F 17/30575 |
| 2007/0005662 | A1 * | 1/2007 | Bankston | G06F 17/30575 |
| 2009/0006587 | A1 * | 1/2009 | Richter | H04L 29/12009 709/220 |
| 2009/0210429 | A1 * | 8/2009 | Agrawal | G06F 17/30578 |
| 2009/0228511 | A1 * | 9/2009 | Atkin | G06F 17/30076 |
| 2014/0089387 | A1 * | 3/2014 | Chapman | H04L 29/0619 709/203 |
| 2014/0244584 | A1 * | 8/2014 | Song | G06F 17/30345 707/627 |

* cited by examiner

Primary Examiner — Dustin Nguyen
Assistant Examiner — Hao Nguyen
(74) Attorney, Agent, or Firm — Jones Day

(57) ABSTRACT

A clustered server system and a method for maintaining a server cluster involve a plurality of servers that collectively form a server cluster. A master database stores configuration information concerning the server cluster. Each server stores a local copy of the configuration information in a file system. The servers automatically update their respective file system using a database copy of the configuration information if the configuration information changes in the database.

20 Claims, 7 Drawing Sheets

SERVER CLUSTERING IN MOBILE COMPUTING ENVIRONMENT

FIELD OF THE INVENTION

The present invention generally relates to data server clustering. More specifically, the present invention relates to clustering of data servers in a mobile computing environment in which data servers service requests directed to a back end database.

BACKGROUND INFORMATION

Mobile computing environments typically include a data server that operates as an intermediary between a mobile client and a back end data source. Numerous clients can potentially be connected to the data server at any given time, making it difficult to service data access requests from all of the clients. Therefore, a need exists for a way to make data access highly available to mobile clients.

SUMMARY

Example embodiments of the present invention relate to a system and methods for data server clustering. In the context of the example embodiments, clustering involves the grouping of a plurality of data servers so that the servers work in cooperation with one another to service data access requests from client devices. Each server may service, independent of the servicing of requests at other servers, requests that it receives.

In an example embodiment, intra-group communication is used to propagate configuration changes throughout servers in the group, for example when the cluster is setup for the first time or when configuration changes occur after the initial setup. This allows configuration changes at any particular server to automatically be replicated at the other data servers in the cluster, with little or no additional manual configuration. Therefore, the size of the cluster can be scaled up or down with ease.

In an example embodiment, a file system of each server stores configuration information. The file systems are synchronized to a master database and, when configuration information changes in the database, the file systems are updated by reading from the database.

In an example embodiment, each server caches data retrieved from the master database. A cache eviction procedure is performed when data changes occur in the database and a corresponding copy of the changed data exists in the cache. This ensures that the caches do not send outdated data.

In an example embodiment, the file system is updated using the information in the master database each time the server starts up. This ensures that the server has the latest copy of configuration information, which may not have been loaded into the file system prior to startup. This may occur when, for example, the server is added to the cluster for the first time or when the file system changed on another server while the server was shut down.

DETAILED DESCRIPTION

Example embodiments of the present invention relate to a system and methods for clustering of data servers in a mobile computing environment where the end user accesses a data source using a mobile computing device. However, the embodiments are also applicable to non-mobile environments that are serviced by data servers, for example, local area networks.

In an example embodiment, a method and a corresponding system for maintaining a server cluster involve storing configuration information concerning the server cluster in a master database, wherein the server cluster includes a plurality of servers; at each server, storing a local copy of the configuration information in a respective file system; and automatically updating the file systems using a database copy of the configuration information if the configuration information changes in the database.

Figure 1:
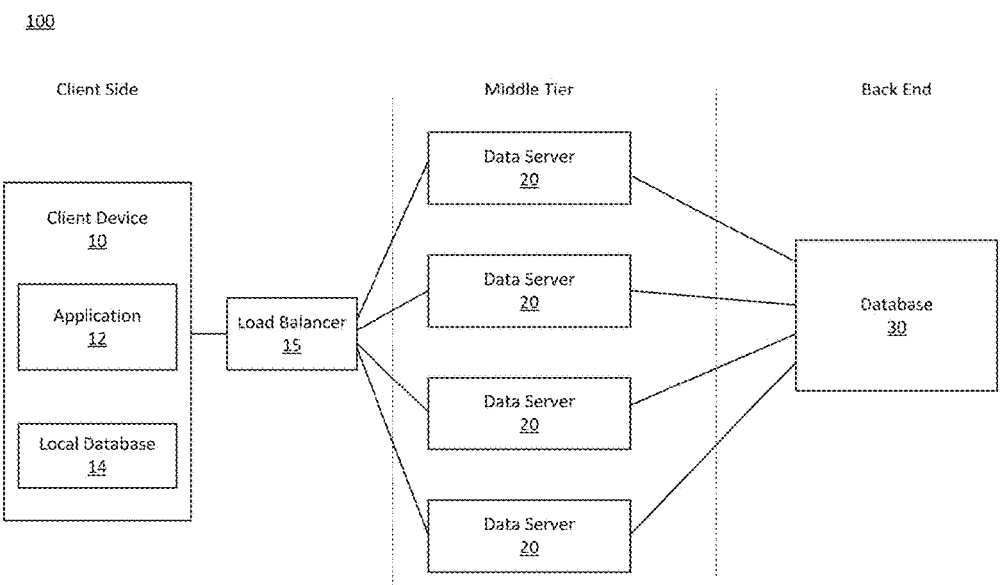
FIG. 1 is a block diagram of a clustered computing system according to an example embodiment of the present invention.

FIG. 1 shows a system 100 in which a plurality of data servers are clustered together. The system 100 is divided into three sections: a client side, a middle tier and a back end. The client side includes a client device 10, which is a mobile computing device such a laptop, a tablet or a smartphone. The middle tier includes data servers 20, which are referred to herein as nodes in the cluster. The back end includes a database 30, which may be located on a separate server remote from the data servers 20.

The client device 10 may be any mobile computing device and is not platform specific, but is instead representative of a mobile device running one of any number of conventional mobile platforms such as Windows Mobile, Palm OS, Android and iOS. The client device 10 wirelessly communicates with the middle tier by transmitting data access requests to, and receiving responses to those requests from, a node 20 in the middle tier. The data access requests are issued by a client application 12 and may be redirected to a remote data source such as the database 30. Requests may be received at any one of the nodes 20 and processed before being redirected. Data returned by the database 30 is relayed to the client device 10 via the same node 20 that redirected the request, possibly after some additional processing by the node. Data received at the node 20 may be stored in a local database 14. Changes to the data in the database 14 may also be transmitted for storage at the database 30. The transmission may occur while the client 10 is connected to the middle tier. However, changes to the data in the local database may occur while the client 10 is disconnected, in which case the changes are transmitted when the client 10 is reconnected.

The client requests may be transmitted to a selected node 20 through a router in the client side. The router is shown in FIG. 1 as a load balancer 15, which operates to balance the distribution of data access requests across all the nodes 20. For example, a simple load balancing scheme may involve assigning access requests to randomly selected nodes. Other load balancing schemes may alternatively be implemented. In one embodiment, the load balancer may implement what is referred to herein as "session affinity." This occurs when the client issues multiple requests within a relatively short time period (e.g., 30 seconds). In this situation, the load balancer directs each of the requests to the same node. Session affinity is advantageous because, as explained later, each node 20 may cache data that is requested from the database 30. Since subsequent requests within a short time period are likely to reference the same data, the node that serviced the initial request is in a better position to provide access to the same data by obtaining the data from its cache rather than from the database 30. Additionally, less overhead is involved because a single communication session is maintained between the client and the node that serviced the initial request, whereas establishing a session to another node may be time consuming.

Figure 2:
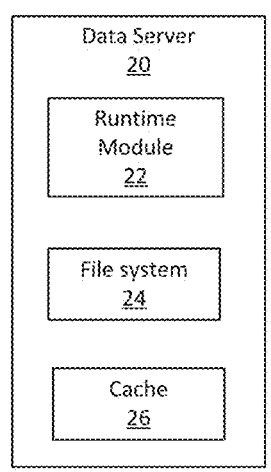
FIG. 2 is a block diagram of an individual node in a cluster according to an example embodiment of the present invention.

FIG. 2 shows an example embodiment of a node 20. Each of the nodes 20 may include a runtime module 22, a file system 24 and a cache 26. The runtime module 22 services requests from the client 10 by, for example, establishing connections to the database 30 or another back end service, accessing data in the back end, and returning the data to the client 10. Although described as a single module, the runtime component may in actuality comprise a large group of modules (known as bundles), with each bundle operating independently of one another.

The file system 24 is a non-volatile memory that stores configuration information concerning the application 12 and/or the nodes 20. The configuration information may include information that configures the application 12 and/or a server that returns data to the application 12, e.g., a server that hosts the database 30. Examples of application configuration information include, but are not limited to, a Uniform Resource Locator (URL) for the back end server, e.g., http://somesever:port, and an authentication method used to connect to the back end server, e.g., Hypertext Transfer Protocol Secure (HTTPS) Basic authentication, Security Assertion Markup Language (SAML), Kerberos, etc. The configuration information may also include front end URLs that specify addresses of the nodes 20. Examples of server configuration information include, but are not limited to, connection parameters such as an HTTP port, HTTPS port, or a special port for administrative access.

In an example embodiment, the file system 24 is replicated on all the nodes 20 in the cluster. In another embodiment, the file system 24 may only be replicated on some of the nodes 20, for example, every other node. Although the file system 24 may be replicated, this does not require that the local copy of the file system 24 in each node 20 be shared between nodes 20. That is, each node 20 may not have direct access to the file system 24 in other nodes 20. In fact, it is typically difficult to implement file system sharing, in some cases impossible. Accordingly, in one embodiment of the present invention, at least some of the configuration information is primarily stored in the database 30. This enables configuration changes to be propagated through the various files systems 24 without requiring file system sharing.

When the configuration information (collectively referred to as a node's state) changes in any particular node 20, the changes should be reflected in the states of the other nodes 20. Example embodiments provide a mechanism for communicating configuration and/or data changes throughout the cluster.

In an example embodiment, the file system 24 is configured as a secondary storage location for data in the database 30. Thus, the database 30 may operate as a master database that stores the configuration information along with application data accessed by the client 10. The file system 24 is secondary because the database 30 always maintains the latest copy of any data used by the nodes 20. The nodes 20 may read from the database 30 to obtain the latest copy of the data when necessary. In the event of a conflict between the file system 24 and the database 30, the copy of the data in the database 30 controls so that the file system copy is overwritten. In an example embodiment, the file system 24 is updated by reading from the database 30 whenever the node 20 is restarted.

Example state changes include the opening and configuration of a new URL (or modification of an existing URL) to enable a request from a client to be directed to the proper back end destination. Each node 20 may maintain the same list of URLs in its respective file system 24 so that an access request is equally serviceable by any of the nodes 20. Similarly, each node 20 may maintain the same list of back end connections (e.g., a connection pool), which are selectable for connecting to the back end. Password settings and other security configurations may also trigger state changes. Logging configurations (which control the logging of activity at each individual node 20) are yet another example of configuration information that can trigger a state change.

In an example embodiment, an administrative user may trigger state changes by manual changing configuration files through an administration utility. The utility includes a user interface that enables the administrator to configure, for example, the back end connections and the URLs.

The cache 26 is a volatile memory that operates as a temporary data store for data retrieved from a back end data source such as the database 30. The data in the cache 26 may include application data. The cache 26 may also store configuration information. Data stored in the cache 26 may remain there until removed or the node 20 is restarted. In one embodiment, cache data may be assigned a time-to-live (TTL), which specifies how long the data can remain in cache without being accessed again. If no further access occurs within the TTL period, the data is considered stale and therefore the data is deleted from the cache 26 or invalidated. If data is available in the cache 26 for servicing a request, the data may be read from the cache 26 rather than performing a time consuming access to the database 30.

In an example embodiment, the system 100 includes a cache eviction mechanism that works in cooperation with an intra-group communication mechanism. When a state change or an application data change occurs at any particular node 20, a notification is broadcast to the other nodes in the cluster. In response to receiving the notification, the other nodes determine on an individual basis whether data in the respective cache 26 should be removed because the data was changed. Cache eviction may be used as an alternative to or in combination with TTL. The cache eviction and intra-group communication mechanisms may be integrated in the runtime module 22 or as separate software modules executing concurrently at the node 20. In an example embodiment, each node 20 includes an application program interface (API) that monitors activity within the runtime module 22 to detect whether a system call issued in the node involves a commit transaction, e.g., any transaction that writes data to or deletes data from the database 30. Intra-group communication may be implemented using a broadcast mechanism that responds to the detection of commit transactions by the API. Various tools exist for implementing broadcasting. For example, the JGroups multi-casting toolkit may be used to form the broadcasting mechanism in the system 100.

Figure 3:
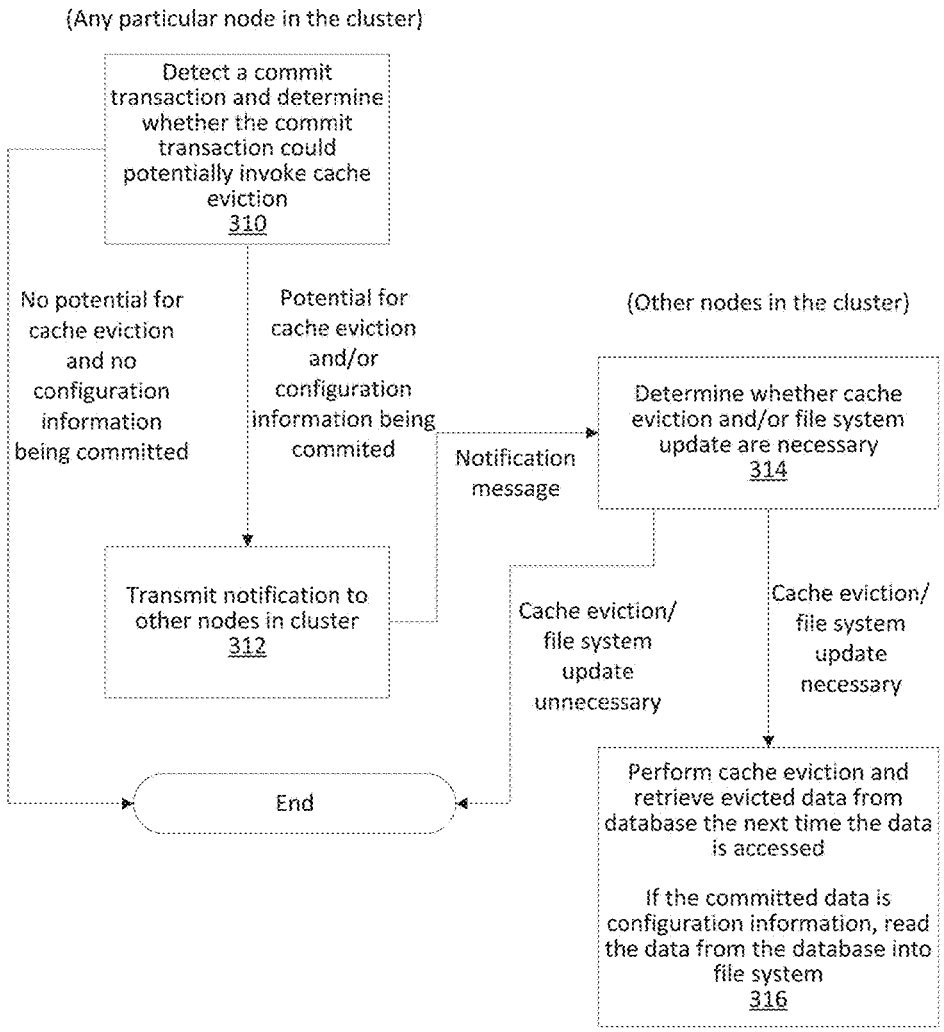
FIG. 3 is a flowchart of a method for propagating database changes, using cache eviction according to an example embodiment of the present invention.

FIG. 3 is a flowchart of a method 300 according to an example embodiment of the present invention. The method 300 may be performed in the system 100 and refers to state and/or application data changes that occur after a cluster has already been setup. At step 310, a node 20 in the cluster detects that a commit transaction has occurred locally in the node. The node proceeds to determine whether the commit transaction could potentially trigger cache eviction at another node. For example, if a commit transaction involves an update or a delete operation, this affects an existing data object in the database 20, which existing data object could potentially be residing in another node's cache. By contrast, if the commit transaction involves an insert operation, the transaction does not affect an existing data object in the database 20, and therefore the transaction cannot trigger cache eviction. The node also determines whether the commit transaction involves configuration information (in which case notification is required for updating the file system on other nodes).

At step 312, the node has determined that there is a potential for cache eviction and/or determined that configuration information is being committed. Therefore, the node transmits a notification message to the other nodes 20 using the broadcast mechanism. The commit transaction specifies what data objects are being committed, and therefore the API may prepare a list of object identifiers for the data objects being committed. This list may be included in the notification message.

At 314, each of the other nodes 20 receives the notification message and determines whether cache eviction is necessary. This may be performed by comparing the object identifiers in the notification message to the objects in the cache 26. In an example embodiment, each object may be indexed to a predetermined cache location in each node, e.g., the same cache location in any particular node. Therefore, determining whether the same objects identified in the notification message exist in the cache 26 is easy. If the same object exists in the cache 26, eviction is performed at step 316. The other nodes 20 may also determine whether a file system update is necessary. In example embodiments, file system updates are necessary whenever configuration information is committed.

In step 316, any cache object matching an object in the notification message is evicted by, for example, invalidating its corresponding cache entry or erasing the cache entry altogether. The next time the object is accessed through the same node, that node determines that the object is not available in the cache 26 and therefore reads the object from the database 30. At that time, the newly read object is also placed in the cache 26, where it may continue to reside until it is locally modified, evicted again in response to a commit transaction at another node or, if TTL is used, the object expires.

Additionally, when the committed data is configuration information, the other nodes 20 may automatically read the latest copy of the configuration information from the database 30 into their respective file systems 24, without waiting for a subsequent access. In this manner, the file system 24 in all the nodes 20 is always kept up-to-date. Therefore, file system changes in any particular node (for example a URL change) take immediate effect throughout the cluster and the ability of the nodes 20 to service client requests is unaffected.

In an example embodiment, the cluster manages itself by broadcasting notifications of changes to cluster membership, for example, when a node 20 joins or leaves the cluster. To support cluster management, each node may maintain, as part of its configuration information, an up-to-date list of all cluster members. Similar to the earlier described examples of configuration information, a master copy of the membership list can be maintained in the database 30. In addition to the membership list, membership information maintained in the database 30 may include, but is not limited to, version information for each node in the cluster, version information for the cluster as a whole, and a network address of each member. When changes to cluster membership occur, this may require a file system update. Membership changes may also trigger a self-diagnostic procedure in each cluster member based on the version information. An example of a membership change will now be described in connection with FIG. 4.

Figure 4:
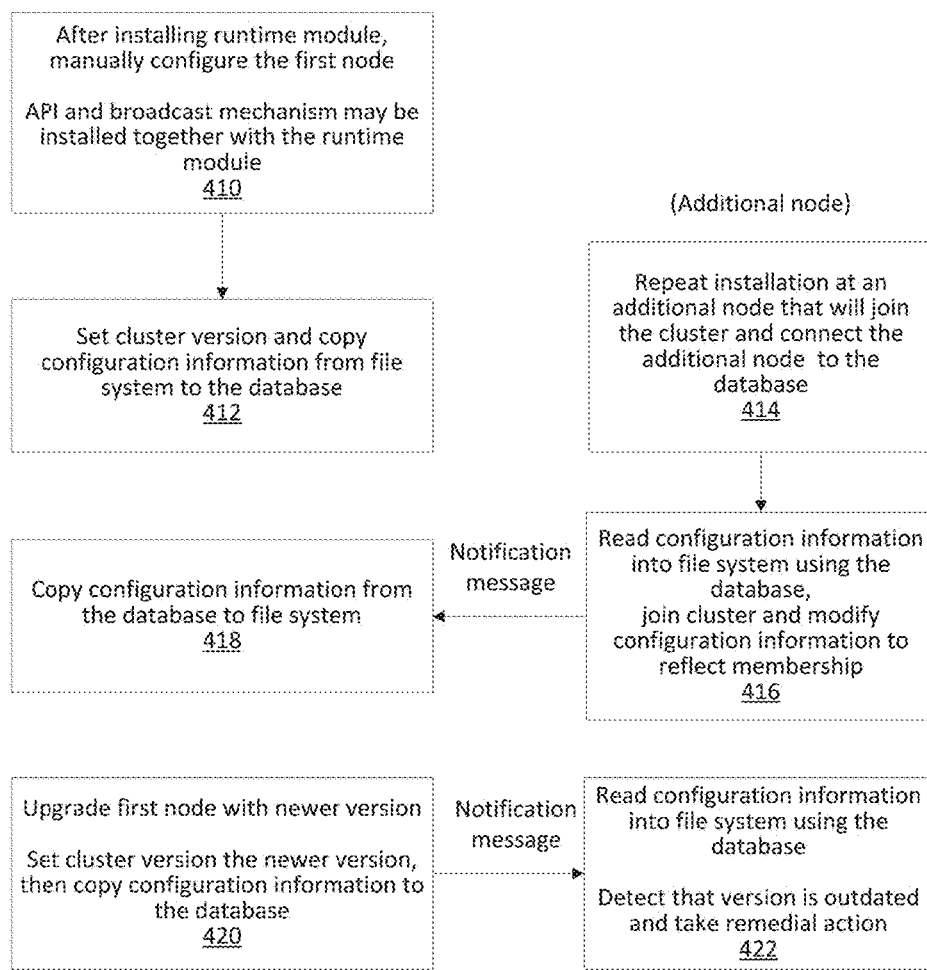
FIG. 4 is a flowchart of a method for configuring a cluster according to an example embodiment of the present invention.

FIG. 4 is a flowchart of a method 400 according to an example embodiment of the present invention. The method 400 may be performed in the system 100 and refers to state changes resulting from changes in cluster membership. In this example, the cluster is being setup for the first time. However, as will be explained, the method 400 is also applicable to membership changes that occur after the cluster is setup. At step 410, the runtime module 22 is installed at a first node joining the cluster, thereby enabling the administrator to, via the administration utility, configure the first node by referencing the database 30 as a backend data source and configuring backend connections to the database 30. The broadcast mechanism and API may be installed at the same time as the runtime module to initiate cluster communication.

At step 412, the first node 20 verifies that it can connect to the database 30 and sets its version to that of the cluster. Since no other node is currently a member, the cluster version is set to that of the first node 20. The first node's configuration information and the cluster membership information are automatically copied from the file system 24 to the database 30 and the first node 20 may begin servicing client requests.

At step 414, the installation of the runtime module 22, the API and the broadcast mechanism are repeated at an additional node. The additional node is then connected to the database 30.

At step 416, the additional node automatically reads the configuration information from the database 30 into its file system, adds itself as a cluster member, and modifies the configuration information to reflect its membership. The modification of the configuration information triggers a notification received by the first node.

At step 418, the first node responds to the notification by updating the configuration information stored in its file system using the database 30. The first node and the additional node now share identical configuration information and file systems, including identical versions. As apparent in the above described steps, the storage of membership information in the database 30 provides a convenient way for cluster members to discover each other.

At step 420, the first node is upgraded, e.g., with a new version of the runtime module 22. The first node may check whether the new version is compatible with the cluster version (e.g., that the version number is greater than cluster version). If so, the upgrade is performed and the first node sets the cluster version to the new version, then updates the database 30 with this new configuration information, triggering a notification to the additional node.

At step 422, the additional node responds to the notification by reading the configuration information from the database 30. The additional node detects that its version is outdated and therefore takes remedial action, for example, by shutting down and/or removing itself from the cluster. In an example embodiment, the nodes 20 are configured to check for version compatibility between the node version and the cluster version each time the node starts up. Additionally, the file system is automatically updated using the database 30 each time the node starts up.

Figure 5:
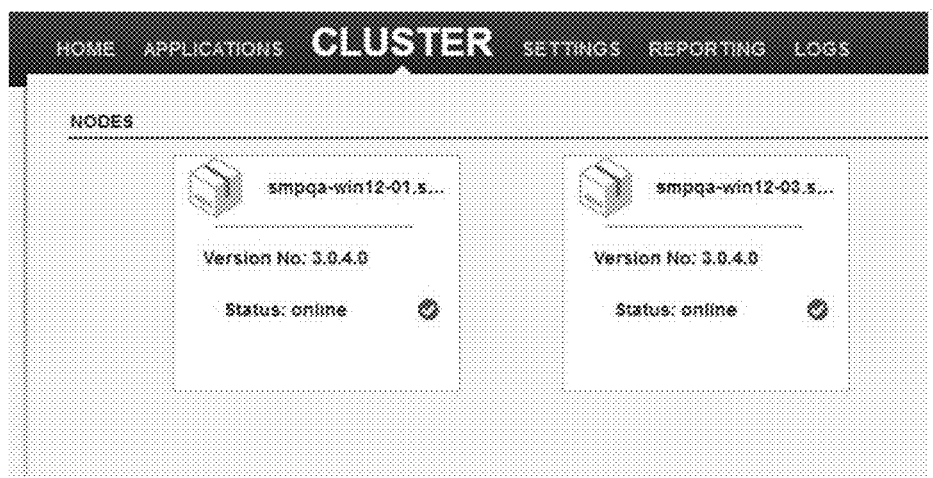
FIGS. 5 to 7 are graphical user interfaces in an administration utility according to example embodiments of the present invention.

FIG. 5 is an example graphical user interface (GUI) 500 in an administration utility according to an example embodiment of the present invention. The GUI 500 shows information for nodes in a cluster. The information includes status information indicating whether the node is currently fully operational and communicating with clients, i.e., "online," and a version number of each node.

Figure 6:
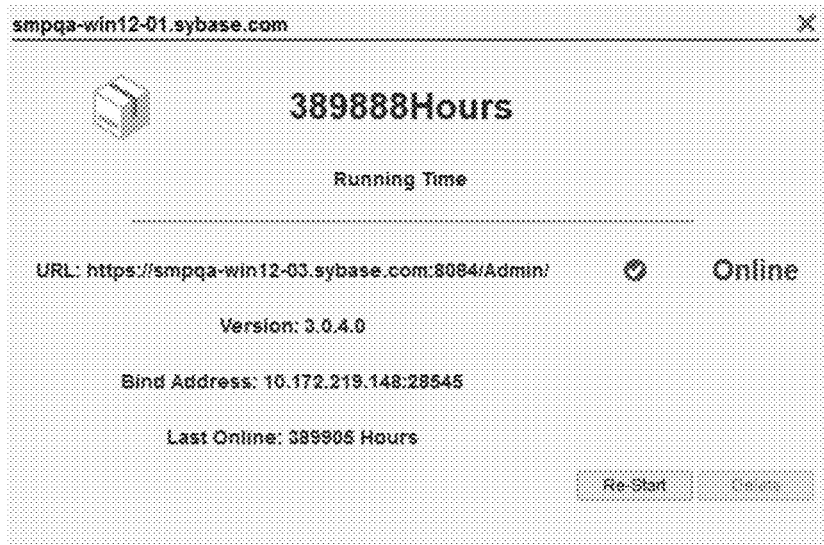

FIG. 6 is an example GUI 600 in an administration utility according to an example embodiment of the present invention. The GUI 600 shows detailed information for a single node. The GUI 600 may be accessed, for example, via the GUI 500 in FIG. 5 by selecting on an individual node. The detailed information includes a running time, e.g., a duration since the last restart of the node, a network address of the node (e.g., a URL), an Internet Protocol (IP) address of the node (e.g., a bind address), and the last time the node went online. In this regard, a node may be operational but taken "offline," at which point the node cannot communicate with clients but remains in a configured state.

Figure 7:
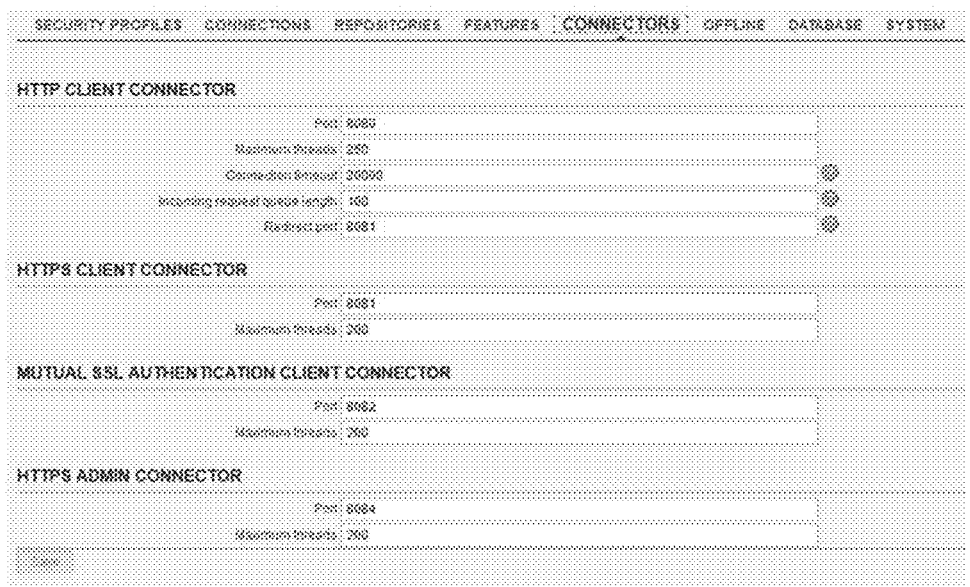

FIG. 7 is an example GUI 700 in an administration utility according to an example embodiment of the present invention. The GUI 700 shows examples of connection related configuration information that the administrator can manually set. Configuration information is shown for various types of connections including HTTP client connections, HTTP Secure (HTTPS) client connections, mutual Secure Sockets Layer (SSL) authentication client connections, and administrator specific connections. Changes in any of the configuration information shown in FIG. 7 may trigger a file system update at the nodes 20.

An example embodiment of the present invention is directed to one or more processors, which can be implemented using any conventional processing circuit and device or combination thereof, e.g., a Central Processing Unit (CPU) of a Personal Computer (PC) or other workstation processor, to execute code provided, e.g., on a non-transitory hardware computer-readable medium including any conventional memory device, to perform any of the methods described herein, alone or in combination. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), flash memory and magnetic tape.

An example embodiment of the present invention is directed to a non-transitory, hardware computer-readable medium, e.g., as described above, on which are stored instructions executable by a processor to perform any one or more of the methods described herein.

An example embodiment of the present invention is directed to a method, e.g., of a hardware component or machine, of transmitting instructions executable by a processor to perform any one or more of the methods described herein.

The above description is intended to be illustrative, and not restrictive. Those skilled in the art can appreciate from the foregoing description that the present invention may be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings and specification. Further, steps illustrated in the flowcharts may be omitted and/or certain step sequences may be altered, and, in certain instances multiple illustrated steps may be simultaneously performed.

What is claimed is:

1. A method for maintaining a server cluster implemented by one or more data processors forming one or more computing devices, the method comprising:
 storing, by at least one data processor, configuration information concerning the server cluster in a master database, wherein the server cluster includes a plurality of servers operating as a front end to a client computing device;
 receiving, by at least one data processor of a client load balancer, a data request from the client computing device, the client load balancer operating between the client computing device and the plurality of servers;
 in response to the data request, determining, by at least one data processor of the client load balancer, using a load balancing scheme, a designated server of the plurality of servers for load balancing purposes to transmit the data request, wherein the load balancing scheme balances the distribution of data access requests across the plurality of servers and maintains the designated server for subsequent data requests received within a predetermined time period of the data request;
 at each server, storing, by at least one data processor, a local copy of the configuration information in a respective file system, wherein the configuration information stored in the master database supersedes the local copy when the local copy and configuration information conflict;
 automatically updating, by at least one data processor, the file systems of the plurality of servers using a master database copy of the configuration information if the configuration information changes in the master database;
 at each server, detecting, by at least one data processor, a commit transaction has occurred locally and determining whether the commit transaction invoke cache eviction;
 at each server, broadcasting, by at least one data processor, a notification across the plurality of servers in the cluster;
 at each server, determining, by at least one data processor, whether cache eviction is necessary; and
 at each server, performing, by at least one data processor, cache eviction and retrieving data from the master database the next time the data is accessed.

2. The method of claim 1, wherein the configuration information describes back end connections between the servers and the database.

3. The method of claim 1, wherein the configuration information includes Uniform Resource Locators (URLs).

4. The method of claim 1, further comprising: broadcasting, by at least one data processor, a notification throughout the cluster if data changes in the master database.

5. The method of claim 4, further comprising: detecting, by at least one data processor, a data change in the master database by monitoring the servers for commit transactions.

6. The method of claim 5, further comprising: broadcasting, by at least one data processor, the notification if the detected data change does not involve inserting new data into the master database.

7. The method of claim 1, further comprising: at each server, storing, by at least one data processor, data retrieved from the master database in a local cache; and responsive to detecting a change in the data stored in the master database, determining, by at least one data processor, whether the local caches currently store a copy of the changed data.

8. The method of claim 7, further comprising: evicting, by at least one data processor, cached copies of the changed data.

9. The method of claim 7, wherein the data stored in the local caches includes application data used by an application of the client computing device.

10. The method of claim 1, further comprising: configuring, by at least one data processor, an additional server to automatically join the cluster, and to automatically copy the configuration information from the master database into its file system upon joining.

11. A system of clustered servers, the system comprising:
one or more data processors forming part of one or more computing devices, wherein one or more computing devices collectively form a server cluster operating as a front end to a client computing device; and
a memory storing configuration information concerning the server cluster, wherein the memory comprises memory storing instructions which when executed result in operations comprising:
receiving, by at least one data processor of a client load balancer, a data request from the client computing device, the client load balancer operating between the client computing device and the server cluster;
in response to the data request, determining, by at least one data processor of the client load balancer, using a load balancing scheme, a designated server of the plurality of servers for load balancing purposes to transmit the data request, wherein the load balancing scheme balances the distribution of data access requests across the server cluster and maintains the designated server for subsequent data requests received within a predetermined time period of the data request;
wherein each server stores a local copy of the configuration information in a respective file system, wherein the configuration information stored in the master database supersedes the local copy when the local copy and configuration information conflict;
wherein the servers automatically update their respective file systems using the master database copy of the configuration information if the configuration information changes in the master database;
wherein each server:
detects a commit transaction has occurred locally and determine whether the commit transaction invoke cache eviction;
broadcasts a notification across the plurality of servers in the cluster;
determines whether cache eviction is necessary; and
performs cache eviction and retrieves data from the master database the next time the data is accessed.

12. The system of claim 11, wherein the configuration information describes back end connections between the servers and the database.

13. The system of claim 11, wherein the configuration information includes Uniform Resource Locators (URLs).

14. The system of claim 11, wherein the server cluster is configured to broadcast a notification throughout the server cluster if data changes in the master database.

15. The system of claim 14, wherein the servers include a mechanism that detects a data change in the master database by monitoring the servers for commit transactions.

16. The system of claim 15, wherein the server cluster is configured to broadcast the notification if a detected commit transaction does not involve inserting new data into the master database.

17. The system of claim 11, wherein: each server stores data retrieved from the master database in a local cache; and each server is configured to, responsive to detecting a change in the data stored in the database, determine whether its local cache currently stores a copy of the changed data.

18. The system of claim 17, wherein each server is configured to evict any copy of the changed data stored in its local cache.

19. The system of claim 17, wherein the data stored in the local caches includes application data used by an application of the client computing device.

20. The system of claim 11, wherein at least one of the servers of the server cluster: automatically joined the cluster; and automatically copied the configuration information from the master database into its file system upon joining.

* * * * *